US012707251B2

(12) United States Patent
Canlas-Factora et al.

(10) Patent No.: US 12,707,251 B2
(45) Date of Patent: Aug. 11, 2026

(54) OPTIMIZED HANDLING OF MONITORING EVENT (MONTE) SUBSCRIPTIONS ON LTE NETWORK

(71) Applicant: T-Mobile USA, Inc., Bellevue, WA (US)

(72) Inventors: Zenaida Castro Canlas-Factora, Renton, WA (US); Alex Pango Abogado, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 281 days.

(21) Appl. No.: 18/654,322

(22) Filed: May 3, 2024

(65) Prior Publication Data

US 2025/0344051 A1 Nov. 6, 2025

(51) Int. Cl.

*H04W 8/20* (2009.01)
*H04W 8/04* (2009.01)
*H04W 60/00* (2009.01)

(52) U.S. Cl.

CPC ............... *H04W 8/20* (2013.01); *H04W 8/04* (2013.01); *H04W 60/00* (2013.01)

(58) Field of Classification Search

CPC .......... H04W 8/20; H04W 8/04; H04W 60/00
See application file for complete search history.

(56) References Cited

U.S. PATENT DOCUMENTS

2022/0312163 A1* 9/2022 Xu .......................... H04W 4/60

* cited by examiner

*Primary Examiner* — Curtis B Odom
(74) *Attorney, Agent, or Firm* — Lee & Hayes, P.C.

(57) ABSTRACT

Techniques, devices, and systems for automatic subscription deletion are discussed herein. For example, a system can include a network exposure function (NEF)/service capability exposure function (SCEF) that receives an event notification message from a mobile management entity (MME). The event notification message may be related to a subscription and may result in an error in the NEF/SCEF. The error may occur based on the subscription being located in a home subscriber server (HSS) but not in the NEF/SCEF. The NEF/SCEF can transmit, to the HSS, a deletion message utilized by the HSS to delete the subscription.

20 Claims, 5 Drawing Sheets

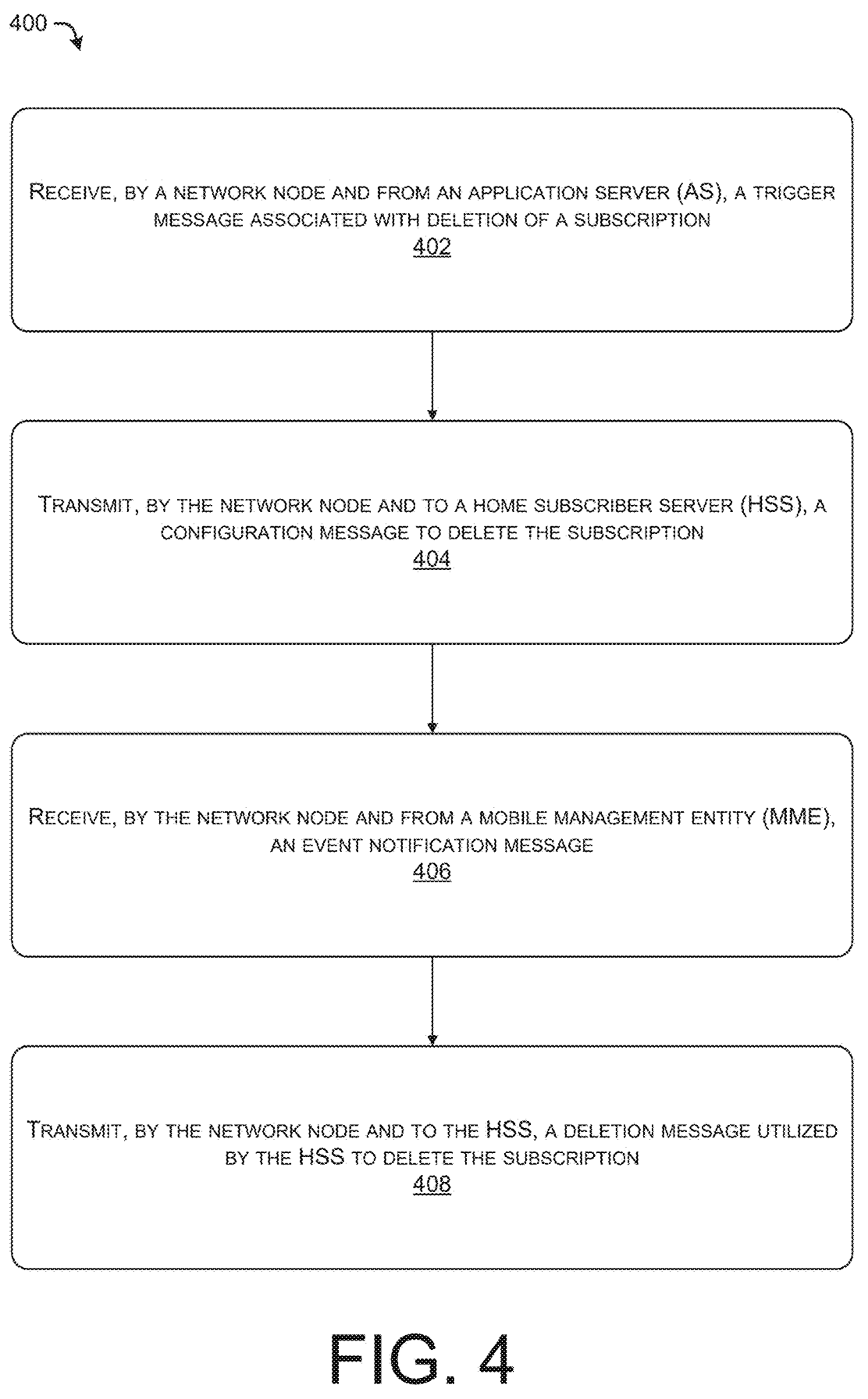

400

RECEIVE, BY A NETWORK NODE AND FROM AN APPLICATION SERVER (AS), A TRIGGER MESSAGE ASSOCIATED WITH DELETION OF A SUBSCRIPTION
402

TRANSMIT, BY THE NETWORK NODE AND TO A HOME SUBSCRIBER SERVER (HSS), A CONFIGURATION MESSAGE TO DELETE THE SUBSCRIPTION
404

RECEIVE, BY THE NETWORK NODE AND FROM A MOBILE MANAGEMENT ENTITY (MME), AN EVENT NOTIFICATION MESSAGE
406

TRANSMIT, BY THE NETWORK NODE AND TO THE HSS, A DELETION MESSAGE UTILIZED BY THE HSS TO DELETE THE SUBSCRIPTION
408

FIG. 4

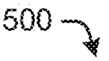
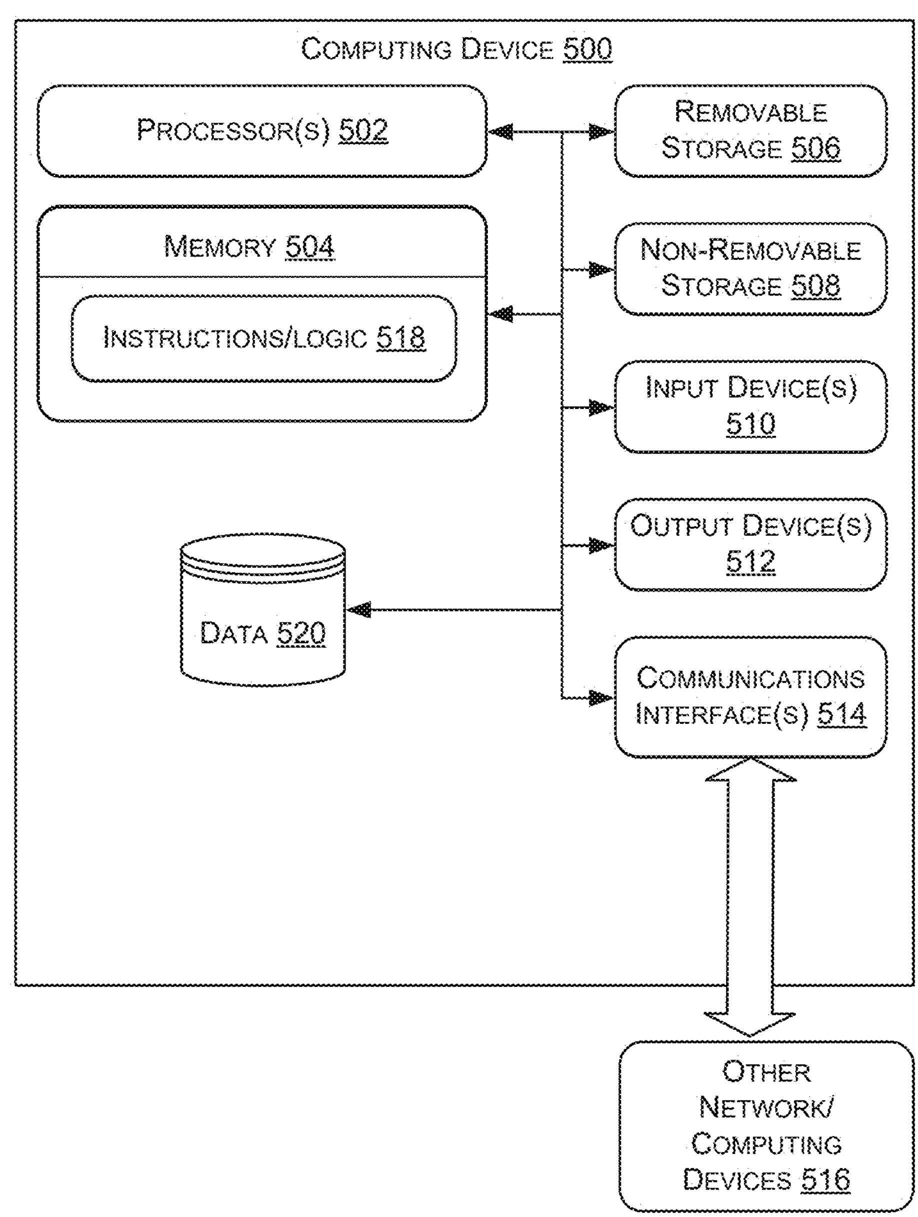
FIG. 5

OPTIMIZED HANDLING OF MONITORING EVENT (MONTE) SUBSCRIPTIONS ON LTE NETWORK

BACKGROUND

Networks that are operated by network providers are usable by applications of third parties. The third parties, such as vendors, develop solutions to achieve reliability in the networks. The third parties manage servers that host applications or software. The applications or software deliver business applications through communication protocols. For web applications, application servers (ASs), for example, of the third parties sit behind web servers. The ASs enable interaction between server-side application codes and user clients. The codes represent, for example, business logic such as custom rules or algorithms that handle the exchange of information between databases and user interfaces (UIs).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 is a flow diagram of an illustrative process for performing automatic subscription deletion management.

FIG. 5 illustrates is a block diagram of a server computer 500 architecture, in accordance with some examples of the present disclosure.

DETAILED DESCRIPTION

This disclosure is directed in part to network exposure functions (NEFs)/service capability exposure functions (SCEFs) that can be utilized for operations associated with automatic subscription deletion. The NEFs/SCEFs can re-request deletions, by home subscriber servers (HSSs), of left-behind and/or lingering subscriptions of particular types. The NEFs/SCEFs can take actions in accordance with reinitiated subscription deletions, notwithstanding previous deletions initiated by application servers (ASs) being incompletely performed. The NEFs/SCEFs can take actions based on the incomplete deletions resulting in unsuccessful removals of the subscriptions by the HSSs. The actions performed by the NEFs/SCEFs can include, in response to subscription deletion messages being received from mobile management entities (MMEs), re-requesting deletion by the HSSs of the subscriptions having been unintentionally left behind.

Figure 1:
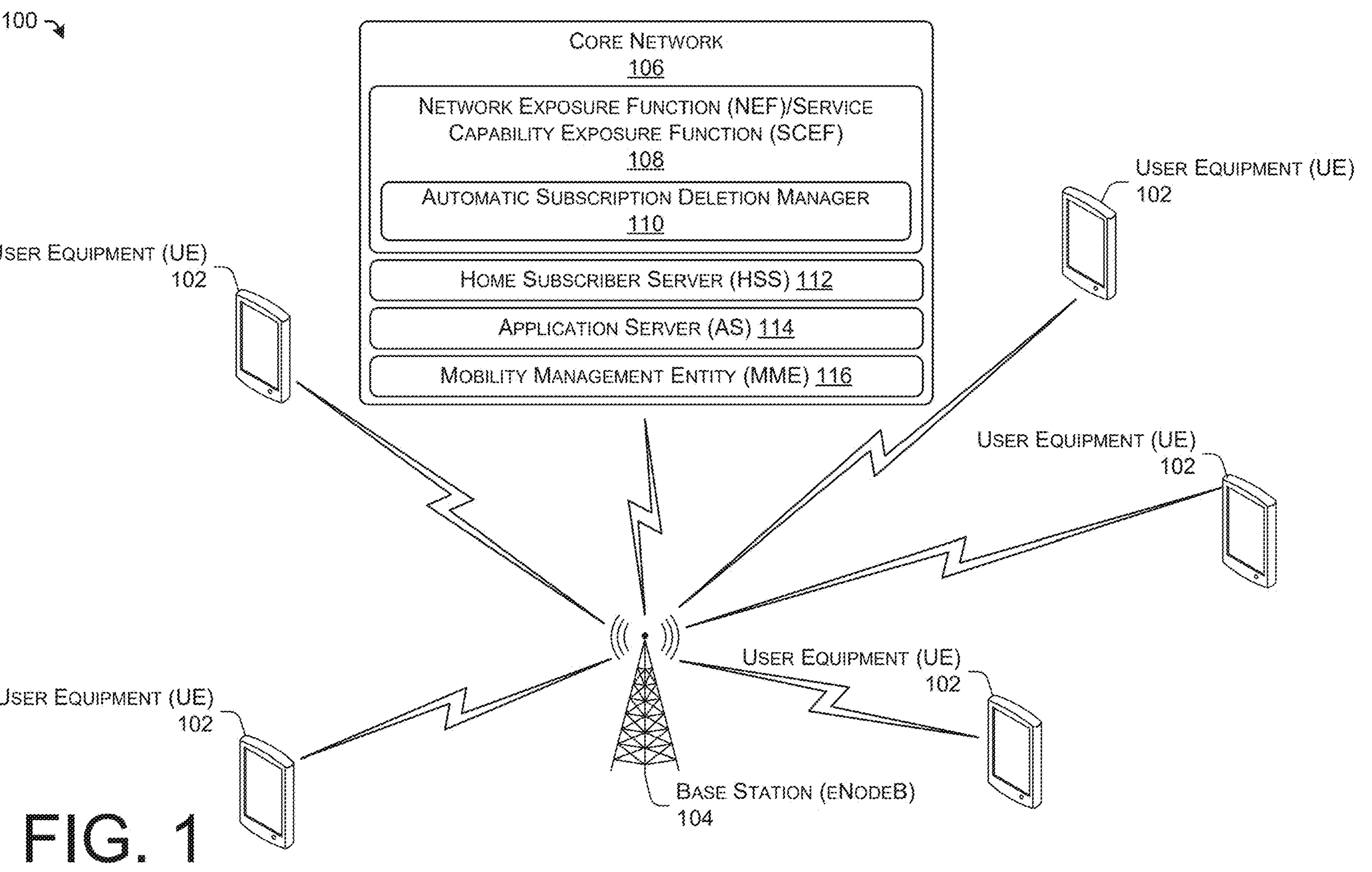
FIG. 1 is an illustrative environment depicting a network exposure function (NEF)/service capability exposure function (SCEF) with an automatic subscription deletion manager, the NEF/SCEF being included in an evolved packet core (EPC) and connected to a cellular network, which may include a base station connecting multiple user equipment (UEs) to the cellular network.

FIG. 1 is an illustrative environment 100 depicting a network exposure function (NEF)/service capability exposure function (SCEF) with an automatic subscription deletion manager, the NEF/SCEF being included in an evolved packet core (EPC) and connected to a cellular network, which may include a base station connecting multiple user equipment (UEs) to the cellular network. The environment 100 includes base stations, such as a base station 104. The base station 104 may be, for example, a fourth generation (4G) long term evolution (LTE) base station, such as an evolved NodeB (or "eNodeB") (or "eNB"). The base station 104 may represent one or more of any types of base stations (e.g., an eNB, a 5G base station (or "next generation Node B") (or "gNodeB") (or "gNB"), etc., or any combination thereof). The environment 100 includes a core network 106.

In the case of the cellular network being a 4G LTE network, the core network 106 may be an LTE core, such as the EPC. The example core network 106 shown in FIG. 1 may include various types of functionality, including the NEF/SCEF, such as an NEF/SCEF 108, with an automatic subscription deletion manager 110. The core network 106 can include an HSS 112, an AS 114, and an MME 116.

While the cellular network may be the 4G LTE network, as discussed above in the current disclosure, it is not limited as such. In some examples, the cellular network may represent any number of networks of any type of cellular technology (e.g., fifth generation (5G) technology, LTE technology, third generation (3G) technology, etc., or any combination thereof).

The NEF/SCEF 108 can be utilized to manage subscriptions. For example, the NEF/SCEF 108 can generate corresponding subscription identifiers (IDs) for new subscription requests. The NEF/SCEF 108 may represent an NEF, a SCEF, or any combination thereof. The NEF/SCEF 108 can store identifiers, destination addresses, monitoring durations, and maximum numbers of reports. The NEF/SCEF 108 may be located between the core network 106 and external third-party application functionaries (and possibly some internal application functions). The NEF/SCEF 108 may be responsible for managing external open network data. External applications that want to access internal data of the core network 106 may be required to pass through the NEF/SCEF 108.

The NEF/SCEF 108 (e.g., the SCEF) may expose network services and capabilities via a set of application programming interfaces (APIs). For example, SCEF instances may be deployed to enable the UEs 102 to exchange data with the MME 116, which in turn may pass that data to the SCEF instances for onward delivery to the AS 114. In some examples, each SCEF instance may have its own identifier (e.g., SCEF-ID).

The automatic subscription deletion manager 110 can be utilized to manage the NEF/SCEF 108 to take various actions and/or perform various functions, such as actions/functions related to automatic subscription deletion associated with a subscription of any of various types. In some examples, the subscription types that may be managed via the automatic subscription deletion more effectively than in existing networks may include various types of monitoring event subscriptions. The monitoring event subscription types may include a subscription, such as a continuous subscription, without any expiration. In those or other examples, the monitoring event subscription types may include a subscription with an expiration that is greater than a threshold expiration (e.g., 5 years, 10 years, 20 years, etc.). For instance, the subscription can have a relatively long expiration time. If the expiration (or "monitor expire time) is not included with the subscription, the subscription stays in the NEF/SCEF 108 (e.g., the NEF) and the HSS 112 until the AS 114 cancels the subscription.

In various cases, initiation of the monitoring event subscription may include the monitoring event subscription being transmitted by the AS 114, which may represent an AS and/or a service capability server (SCS). The SCS, for example, may enables applications to access and use functionality provided by service components over standardized interfaces (APIs). The SCS may host one or more service components. The SCS may connect to network functionality by using standardized universal mobile telecommunications system (UMTS) and/or global system for mobile communication (GSM) protocols.

The automatic subscription deletion manager 110 can be utilized to manage the NEF/SCEF 108 in various ways based on deletion of a subscription being initiated. The automatic subscription deletion manager 110 can be utilized to manage the NEF/SCEF 108 to receive, from the AS 114, a trigger message (e.g., a delete subscription message) (e.g., the deletion message 210, as discussed below with reference to FIG. 2) associated with deletion of the subscription.

The automatic subscription deletion manager 110 can be utilized to manage the NEF/SCEF 108 to transmit, to the HSS 112, a configuration information request (CIR) message (e.g., the CIR message 212, as discussed below with reference to FIG. 2). In some examples, transmission of the CIR message may be incomplete for various reasons, causing the CIR message to not be received by the HSS 112.

The automatic subscription deletion manager 110 can be utilized to manage the NEF/SCEF 108 in various ways, such as for instances in which errors occur due to unexpected deletion requests being received by the NEF/SCEF 108. For instance, with examples in which the subscription is not successfully deleted by the HSS 112 due to the CIR message not being received by the HSS 112, the automatic subscription deletion manager 110 can be utilized to manage the NEF/SCEF 108 to receive, from the MME 116, an event notification message (e.g., the RIR message 214, as discussed below with reference to FIG. 2). The event notification message may be a deletion request that the NEF/SCEF 108 is not expecting due to the subscription having been previously deleted by the NEF/SCEF 108. The unexpected deletion request, e.g., a redundant and/or duplicate deletion request, may be received by the NEF/SCEF 108. The unexpected deletion request may be received, in those or other examples, due to the subscription not having been successfully deleted by the HSS 112.

The automatic subscription deletion manager 110 can be utilized to manage the NEF/SCEF 108 in various ways based on the unexpected deletion request. The automatic subscription deletion manager 110 can be utilized to manage the NEF/SCEF 108 to transmit, to the MME 116, and in response to receiving the event notification message, an error message (e.g., a message with a 5515 error code 216, as discussed below with reference to FIG. 2) based on the subscription not existing in the NEF/SCEF 108. For example, the error message can include an error code (5515), such as a code indicating that a reference ID (e.g., an SCEF reference ID) received in the unexpected deletion request is unknown by the NEF/SCEF 108.

The automatic subscription deletion manager 110 can be utilized to manage the NEF/SCEF 108 in various ways to prevent reoccurrences of any subsequent deletion request errors. In some examples, the automatic subscription deletion manager 110 can be utilized to manage the NEF/SCEF 108 to transmit a deletion message (e.g., the CIR message 218, as discussed below with reference to FIG. 2) to the HSS 112. The HSS 112 can receive the deletion message and delete the subscription in response to the receiving of the deletion message.

The HSS 112 can transmit a notification message (e.g., the insert subscription data request (IDR) message 220, as discussed below with reference to FIG. 2) to the MME 116, to notify the MME 116 of the deletion of the subscription. The MME 116 can transmit an answer message (e.g., the insert subscription data answer (IDA) message 222, as discussed below with reference to FIG. 2) to the HSS 112. The HSS 112 can transmit an answer message (e.g., the configuration information answer (CIA) message 224, as discussed below with reference to FIG. 2)) to the NEF/SCEF 108. The CIA message may include a success result code (2001). The CIA message may notify the NEF/SCEF 108 of the deletion. In some examples, the CIA message may include a notification associated with the HSS 112 and that indicates the deletion of the subscription in the HSS 112. In those or other examples, the CIA message may include a notification associated with the MME 116 and that indicates the deletion of the subscription in the MME 116.

The HSS 112 may provide a central database that contains user-related and subscription-related information. The functions of the HSS 112 can include mobility management, call and session establishment support, user authentication and access authorization. In some examples, the HSS 112 can manage subscription-related information in real time, for multi-access and multi-domain offerings.

The AS 114 in some examples may host applications to be executed or interfaced with the UEs 102. The AS 114 may utilize data stored in the HSS 112, such as to dispatch logic of a service hosted and executed by the AS 114.

The MME 116 can support functions related to subscriber and session management, including security functionality, terminal-to network session handling, and idle terminal location management. As discussed above in further detail, the MME 116 can interface with the NEF/SCEF 108.

By transmitting the CIR message 218, from the NEF/SCEF 108 and to the HSS 112, causing the HSS 112 to delete the subscription, subsequent triggering by the MME 116 of additional RIRs, and corresponding error messages returned by the NEF/SCEF 108, that may otherwise occur in existing systems, may be avoided according to the techniques discussed herein. The NEF/SCEF 108 automatically transmits the CIR message 218, and/or automatically transmits an error message to the MME 116. Thereby the NEF/SCEF 108 ensures that the subscription is deleted from the HSS 112 and the MME 116.

By ensuring that the subscription (e.g., that was previously deleted from the NEF/SCEF 108) is deleted from the HSS 112 and the MME 116, the NEF/SCEF 108 may be utilized to prevent the MME 116 from subsequent unnecessary triggering/reporting based on the subscription being deleted and the subscription related data (e.g., data related to the subscription, which may be a continuous subscription or a subscription with a long expiration date/time) in the NEF/SCEF 108, the HSS 112, and the MME 116, being aligned and synchronized.

By utilizing the NEF/SCEF 108 to perform the automatic subscription deletion according to the techniques dissed herein, interruptions and/or undesirable impacts to services that may otherwise occur in existing cellular networks may be prevented. In contrast to cellular networks managed according to conventional technology, issues associated with initial deletions unsuccessfully performed by the HSS 112 can be resolved by delivering solutions via automation, and message flow between network elements may thereby result in desired outcomes. For example, the NEF/SCEF 108 being managed to perform automatic subscription deletion according to the techniques dissed herein may resolve issues in the HSS 112 without requiring human intervention. By not requiring the human intervention, the NEF/SCEF 108 utilized to perform the automatic subscription deletion according to the techniques dissed herein reduces, and, in some cases, eliminates, the need for any human response to resolve the issues in the HSS 112.

By utilizing the NEF/SCEF 108 to perform the automatic subscription deletion according to the techniques dissed herein, various types of issues, such as the issues associated with initial deletions being unsuccessfully performed by the HSS 112 may be resolved quickly, efficiently, and effectively. By utilizing the automatic subscription deletion to resolve the issues associated with initial deletions being unsuccessfully performed by the HSS 112, network performance may be improved. For example, network latency, jitter, and/or packet loss may be reduced. In such an example or another example, network throughput, speed, available bandwidth, network availability, and/or quality may be increased. Network performance may be improved as a result of fewer subscription deletion related error messages being transmitted and/or processed, due to the performance, utilizing the NEF/SCEF 108, of the automatic subscription deletion, according to the techniques dissed herein.

As a hypothetical example, if the AS 114 sends a delete subscription and the NEF (e.g., the NEF/SCEF 108) receives it, the NEF/SCEF 108 may delete the subscription and forward the delete subscription request to the HSS 112. If the message is not received by the HSS 112. due to any of several factors such as some type of network issue, the subscription stays in the HSS 112 but no longer exists in the NEF/SCEF 108, causing a disparity of subscription data between the NEF/SCEF 108 and the HSS 112. When this scenario occurs, the NEF/SCEF 108 will repeatedly receive event triggers (e.g., reporting information requests (RIRs)) from the MME 116 and respond based on current subscription statuses, e.g., no subscription, unless the subscription is deleted from the HSS 112 by another network element, and/or deleted manually, from the HSS 112, by a human.

In the hypothetical example, the issue with the subscription staying in the HSS 112 may be resolved via automatic subscription deletion by utilizing the NEF/SCEF 108. When the MME 116 sends a notification the reaches the NEF/SCEF 108, with the subscription no longer being in an NEF database of the NEF (e.g., the NEF/SCEF 108), the NEF/SCEF 108 may trigger a delete request to the HSS 112 automatically based on received parameter values, e.g., in the RIR, from the MME 116 even if the subscription is no longer in the NEF database. The RIR may include attributes (e.g., parameter values (or "RIR parameter values"), such as one or more values of a user identifier (e.g., an MSISDN), a SCEF reference ID, and/or a monitoring type). This delete subscription from the NEF/SCEF 108 will be accepted by the HSS 112 since the subscription still exists in the HSS 112. The HSS 112 will then notify the MME 116 of the delete subscription request. Once the subscription is deleted from the HSS 112 and the MME 116, the MME 116 will no longer trigger unnecessary events (e.g., subsequent unnecessary subscription deletions).

By performing the automatic subscription deletion by utilizing the NEF/SCEF 108 in such cases in which the subscription is in the HSS 112 but not the NEF/SCEF 108, various improvements to the cellular network may be achieved in contrast to networks operated according to conventional technology. For example, by performing the automatic subscription deletion via the NEF/SCEF 108, unnecessary control plane (CP) messages between the NEF/SCEF 108, the HSS 112, the MME 116, any other network nodes, or any combination thereof, that would otherwise be exchanged in existing systems, can be eliminated in the cellular network operated according to the techniques discussed herein. Inconsistent subscription data that may otherwise exist between the NEF/SCEF 108 and the HSS 112 in existing networks, and that may result in the existing networks being flooded by unnecessary messages, may be avoided in the cellular network being operated according to the techniques discussed herein.

Automatically sending the delete request subscription by the NEF/SCEF 108, based on the subscription being present in the HSS 112 but not in the NEF/SCEF 108, may eliminate the need for human intervention in the delete subscription process that is otherwise required according to conventional technology. No human intervention is required in the cellular network being operated according to the techniques discussed herein, since the NEF/SCEF 108 is able to automatically control deletion of the subscription from the HSS 112. Time consuming audits required for NEFs and HSSs in networks operated according to conventional technology may be reduced or avoided in the cellular network being operated according to the techniques discussed herein.

The NEF/SCEF 108 is able to delete stale subscriptions from the HSS 112 to ensure the data in the HSS 112 is updated and current. Data records between the NEF/SCEF 108 and the HSS 112, databases respectively therein and/or therefore, or any combination thereof, may be managed to be consistent and correct.

Figure 2:
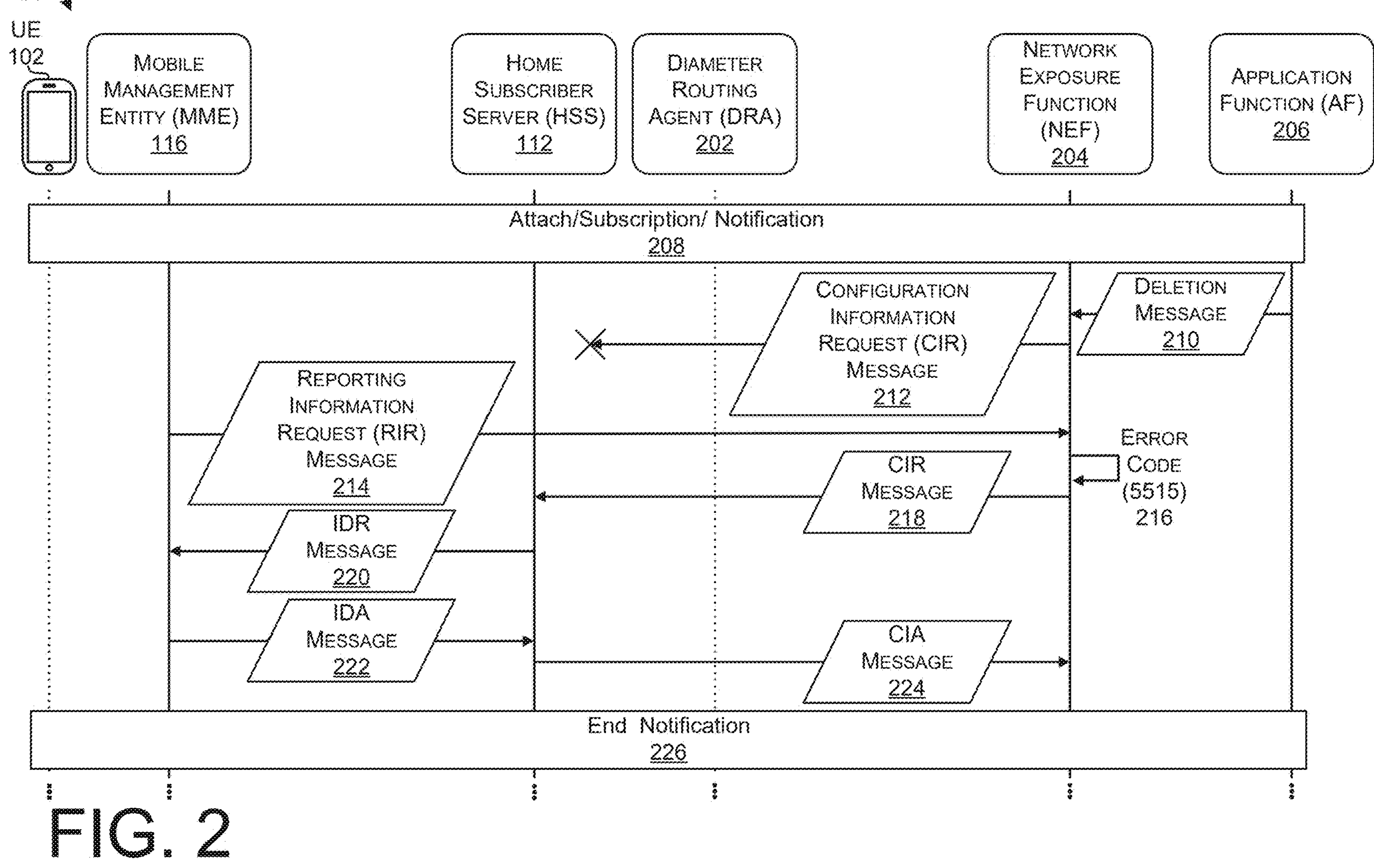
FIG. 2 shows an example call flow illustrating automatic subscription deletion management utilizing the NEF/SCEF.

FIG. 2 shows an example call flow 200 illustrating automatic subscription deletion management utilizing the NEF/SCEF. In some examples, the call flow 200 can be implemented utilizing any portions of the environment 100, as discussed above with reference to FIG. 1, such as, but limited to, the UEs 102, the base station 104, the core network 106 (e.g., the HSS 112, the MME 116, any other portion of the core network 106, or any combination thereof), any other portion of the environment 100, or any combination thereof. In those or other examples, the call flow 200 can be implemented utilizing a diameter routing agent (DRA) 202, the NEF, such as an NEF 204, and an AF 206. The UE 102 and the DRA 202 are shown with corresponding call flow lines illustrated as dotted lines, merely for purposes of ease of explanation, to represent the UE 102 and the DRA 202 not being utilized for any of steps 11-18, as discussed below in further detail.

In those or other examples, the NEF 204 can be utilized to implement the NEF/SCEF 108, as discussed above with reference to FIG. 1; and the AF 206 can be implemented utilizing the AS 114, as discussed above with reference to FIG. 1. The AF 206 may be utilized, for example, to manage location related information, and/or location reporting, associated with a subscriber, based on an application programming interface (API) provided by a third party. The third party may utilize the API and/or the location reporting provided via the AF 206 to get a location of a subscriber (e.g., the UE 102 of the subscriber) and/or to monitor the location of the UE 102. The third party can request transmission of the API (e.g., a location reporting API) to the NEF 204. The NEF 204 can send a subscription request (e.g., an API request) to the HSS 112, which may relay that information (e.g., the API request) to the MME 116. Once the location for the particular UE 102 is found on MME 116, the MME 116 may relay that information (location) to the NEF 204 and likewise to the AF 206. The HSS 112 and/or the NEF 204 may be synchronized and utilized to manage the subscription associated with the subscriber, for which the location reporting is being performed.

While the DRA 202 is not utilized for any of the steps 11-18 as discussed above in the current disclosure, it is not limited as such. In some examples, the DRA 202 may participate in various portions of the call flow. For instance, the DRA 202 may provide real-time routing capabilities to ensure that messages are routed among correct elements in the cellular network. The DRA 202 may be utilized to address diameter signaling traffic and enable network services to be provided. The DRA 202 may be utilized to provide tiered charging, converged billing, and policy enforcement control. The DRA 202 may enable the HSS 112 to ensure that user-service connections are made based on the subscriptions in the HSS 112.

The call flow 200 can include one or more deletion related steps (e.g., one or more deletion related steps being initially performed and resulting in incomplete subscription deletion resulting from the one or more deletion related steps) and/or one or more automatic subscription deletion related steps. The deletion related step(s) (e.g., resulting in incomplete subscription deletion) and/or the automatic subscription deletion related steps may be performed based on one or more other steps (e.g., one or more previous steps, such as steps 1-10, as discussed below in further detail) included in, and/or associated with, one or more attach/subscription/notification processes (or "attach/subscription/notification") 208.

The initial deletion related step(s) may include a step (e.g., a step 11) in which the NEF 204 receives, from the AF 206, a subscription deletion request message (or "deletion message") (or "trigger message") 210. The deletion message (e.g., a T8 interface protocol configuration deletion message) 210 may be associated with deletion of a subscription.

The deletion message 210 may be transmitted by the AF 206 based on the AF 206 identifying that the UE 102 moves to a different tracking area (TA) or a different base station (e.g., a different eNodeB). For example, the deletion message 210 may be transmitted by the AF 206 based on the AF 206 identifying that the UE 102 moves from a current TA to a different TA. Alternatively or additionally, deletion message 210 may be transmitted by the AF 206 based on the AF 206 identifying that the UE 102 moves from the base station 104 to a different eNodeB, or from a previous eNodeB to the base station 104. The TA may include an area, and/or be associated with a logical concept identifying the area, where the UE 102 is able to move around without updating the MME 116.

The initial deletion related step(s) may include a step (e.g., a step 12) in which the NEF 204 transmits a CIR message (or "configuration message") (or "deletion message") 212. The configuration message (e.g., an S6t interface protocol CIR message, such as a SCEF-reference-ID-for-deletion message) 212 may be transmitted by the NEF 204 in response to receiving, by the NEF 204, the deletion message 210.

In various cases, the configuration message 212 may be interrupted (e.g., may remain undelivered and/or unreceived) during transport of the configuration message 212 from the NEF 204 and to the HSS 112. For example, the HSS 112 may not receive the configuration message 212 based on a network issue resulting in delivery of the configuration message 212 being incomplete.

Due to the interruption of the configuration message 212, the deletion related step(s), resulting in incomplete subscription deletion in the HSS 112, may result in one or more steps being incidentally and/or consequentially performed. The incidental and/or consequential step(s) may include one or more RIR delivery steps. For example, any of the RIR delivery step(s) may include a step (e.g., a step 13) in which the MME 116 transmits an RIR message 214 to the NEF 204.

In some implementations, the MME 116 may transmit the RIR message 214 based on the MME 116 identifying that the UE 102 moves to the different TA and/or the different base station. The MME 116 may transmit the RIR message 214 once the subscriber (e.g., the UE 102 associated with the subscriber) latches onto the cellular network. By way of example, the MME 116 may extract and/or obtain data (e.g., associated with the subscriber and the subscription) from the HSS 112, and identify the subscription still standing in the HSS 112. The MME 116 may then send the RIR message 214 to the NEF 204 to be sent out to the AF 206.

The RIR message 214 may include one or more attributes in a similar way as one or more initial RIR messages, as discussed below in further detail. For example, the attribute(s) in the RIR message 214 may include a user identifier (e.g., a mobile station integrated services digital network (MSISDN) identifier) and/or a monitoring event report (e.g., a SCEF reference ID; and/or a monitoring type, such as "location reporting"). The attribute(s) may be associated with the different (e.g., new) TA and/or the different (e.g., new) base station.

The MME 116 may transmit the RIR message 214 to the NEF 204, such as to request information from the NEF 204. The requested information may include information identifying, and/or associated with, the different TA and/or the different base station.

Due to the interruption of the configuration message 212, the incidental and/or consequential step(s) (e.g., based on the incomplete subscription deletion) may include one or more NEF error related steps. For example, any of the NEF error related steps (e.g., associated with a corresponding RIR delivery step) may include a step (e.g., a step 14) in which the NEF 204 identifies an error. For example, the NEF 204 may generate an error code (e.g., an error code associated with a subscription not found in the NEF 204) (e.g., an error code (5515)) 216. The error code (5515) may indicate that the subscription (e.g., identified by the HSS 112 and to the MME 116) is no longer on the NEF 204.

The NEF 204 can act as a decision maker and identify that the RIR message 214 was transmitted by the MME 116 in error. The NEF 204 can identify an absence of a corresponding subscription in the NEF 204 and determine that the subscription needs to still be deleted from the HSS 112 and the MME 116. By triggering, toward the HSS 112, the deletion of the subscription from the HSS 112, and by triggering deletion of the subscription from the MME 116, the NEF 204 can stop all subsequent potential MME requests (e.g., potential RIR messages that would have otherwise been sent in the future) from being sent. The deletion of the subscription, and the prevention of the transmissions of the other unnecessary messages, can prevent the cellular network from being overloaded, as well as clean and synchronize data of the HSS 112, the MME 116, and the NEF 204.

In some examples, the NEF 204 may transmit an error message to the MME 116. The error message may include the error code (5515) 216. The error message may be transmitted to the MME 116 based on the incomplete subscription deletion (e.g., the subscription not being present in the NEF 204).

Due to the interruption of the configuration message 212, the automatic subscription deletion related step(s) may include a step (e.g., a step 15) in which the NEF 204 transmits a configuration message 218. The configuration message (e.g., deletion message) 218 may be transmitted by the NEF 204 and to the HSS 112. The HSS 112 may delete the subscription based on the configuration message 218.

The configuration message (e.g., an S6t interface protocol CIR message, such as a SCEF-reference-ID-for-deletion message) 218 may be transmitted by the NEF 204 in response to the step 11 being completed, and the step 12 not being completed, and in response to steps 13 and 14 being completed. For example, the configuration message 218 may be transmitted in response to the delivery of the deletion message 210, the incomplete delivery of the CIR message 212, the delivery of the RIR message 214, and the generation of the error code 216.

Due to the interruption of the configuration message 212, the automatic subscription deletion related step(s) may include a step (e.g., a step 16) in which the HSS 112 transmits a request message (e.g., an IDR message) 220. The request message 220 may be transmitted by the HSS 112 and to the MME 116. The MME 116 may delete the subscription based on the request message 220.

The request message (e.g., an S6a interface protocol IDR message, such as a SCEF-reference-ID-for-deletion message) 220 may be transmitted by the HSS 112 in response to the step 11 being completed, and the step 12 not being completed, and in response to steps 13-15 being completed. For example, the request message 220 may be transmitted in response to the delivery of the deletion message 210, the incomplete delivery of the CIR message 212, the delivery of the RIR message 214, the generation of the error code 216, and the delivery of the configuration message 218.

Due to the interruption of the configuration message 212, the automatic subscription deletion related step(s) may include a step (e.g., a step 17) in which the MME 116 transmits an answer message (e.g., an IDA message) 222. The answer message (e.g., an S6a interface protocol IDA message, such as a message with a code (2001)) 222 may be transmitted by the MME 116 in response to the step 11 being completed, and the step 12 not being completed, and in response to steps 13-16 being completed. The answer message 222 may be transmitted by the MME 116 and to the HSS 112. For example, the answer message 222 may be transmitted in response to the delivery of the deletion message 210, the incomplete delivery of the CIR message 212, the delivery of the RIR message 214, the generation of the error code 216, the delivery of the configuration message 218, and the delivery of the request message 220.

Due to the interruption of the configuration message 212, the automatic subscription deletion related step(s) may include a step (e.g., a step 18) in which the HSS 112 transmits an answer message (e.g., a CIA message) 224. Transmitting of the answer message 224 may include forwarding, by the HSS 112, the answer message 222 as the answer message 224. The answer message (e.g., an S6t interface protocol CIA message, such as a message with a code (2001)) 224 may be transmitted in response to the step 11 being completed, and the step 12 not being completed, and in response to steps 13-17 being completed. The answer message 224 may be transmitted by the HSS 112 and to the NEF 204. For example, the answer message 224 may be transmitted in response to the delivery of the deletion message 210, the incomplete delivery of the CIR message 212, the delivery of the RIR message 214, the generation of the error code 216, the delivery of the configuration message 218, the delivery of the request message 220, and the delivery of the answer message 222.

Based on the step 11 being completed, the step 12 not being completed (e.g., the CIR message 212 not being received by the HSS 112), and in response to completion of steps 13-18, an end notification 226 can be processed for the subscription. The end notification 226 can be processed to confirm the subscription is no longer present in the HSS 112, the MME 116, the NEF 204, and the AF 206.

Interruption of the configuration message 212 may result in one or more other occurrences (e.g., occurrences which would have otherwise taken place) not taking place. For example, the other occurrence(es) that would have otherwise taken place under ordinary and/or normal network conditions may have included the HSS 112 receiving the configuration message 212. The other occurrence(es) that would have otherwise taken place may have included the HSS 112 transmitting a deletion message, such as by forwarding the configuration message 121 as the deletion message. The deletion message (e.g., an S6a/S6d interface protocol insert subscriber data request (ISDR) message, such as an SCEF-reference-ID-for-deletion message) may have been forwarded to the MME 116.

The other occurrence(es) that would have otherwise taken place may have included messages being exchanged between various portions of the cellular network, such as the NEF 204, the AF 206, the HSS 112, the MME 116, one or more other portions, or any combination thereof. The other occurrence(es) that would have otherwise taken place may have included the MME 116 transmitting an answer message. For example, the MME 116 may have transmitted, to the HSS 112 and in response to receiving the deletion message received from the HSS 112, the answer message (e.g., an S6a/S6d interface protocol insert subscriber data answer (ISDA) message, such as a success service result code (2001)). The other occurrence(es) that would have otherwise taken place may have included the HSS 112 transmitting an answer message. For example, the HSS 112 may otherwise have transmitted (e.g., forwarded), to the NEF 204 and in response to receiving the answer message from the MME 116, the answer message. The HSS 112 may otherwise have transmitted (e.g., forwarded) the answer message, e.g., as an S6t interface protocol message with the success service result code (2001).

The other occurrence(es) that would have otherwise taken place may have included the NEF 204 transmitting a notification message. For example, the NEF 204 may otherwise have transmitted, to the AF 206 and in response to receiving the answer message from the HSS 112, a notify subscription deletion message (e.g., a T8 interface protocol notify subscription deletion message).

In various implementations, and prior to any of the automatic subscription deletion related steps 11-18, the attach/subscription/notification 208 may include the subscription being initiated. The subscription may be managed utilizing the AF 206, which may perform location reporting continuous reporting of the UE 102 associated the subscription.

In various implementations, the subscription may be created by various actions associated with the attach/subscription/notification 208. The actions may include exchanging signals via the NEF 204, the AF 206, the HSS 112, the MME 116, one or more other portions of the cellular network, or any combination thereof.

The attach/subscription/notification 208 may include the subscription being initiated based on a UE 102 being attached. The UE 102 may be attached, e.g., in a step 1, to the cellular network, based on one or more signals exchanged between the UE 102 and the MME 116. The subscription based on the UE 102 being attached may be managed utilizing the NEF 204, the AF 206, the HSS 112, the MME 116, one or more other portions of the cellular network, or any combination thereof. The UE 102 being attached may be associated with a TA (or "original TA") and/or a base station (or "original base station").

The attach/subscription/notification 208 may include, e.g., in a step 2, transmission, by the AF 206, of a location reporting request message. The AF 206 may transmit the location reporting request message (e.g., a T8/N33 interface protocol location reporting request message), such as for the subscription being a continuous subscription (e.g., without any expiration), or a subscription with an expiration that is greater than a threshold expiration. The AF 206 may transmit the location reporting request message to the NEF 204.

The attach/subscription/notification 208 may include, e.g., in a step 3, transmission, by the NEF 204, of a CIR message (e.g., a first CIR message). The CIR message (e.g., an S6t interface protocol CIR location reporting request message) may be transmitted by the NEF 204 and to the HSS 112.

The attach/subscription/notification 208 may include, e.g., in a step 4, transmission, by the HSS 112, of a request message. The request message, such as an ISDR message, (e.g., an S6a interface protocol location reporting request message) may be transmitted by the HSS 112 and to the MME 116. In some instances, the request message transmitted by the HSS 112 may include the HSS 112 forwarding the request message (e.g., received from the NEF 204), as the request message being delivered to the MME 116.

The attach/subscription/notification 208 may include, e.g., in a step 5, transmission, by the MME 116, of an answer message. The answer message, such as an IRDA message, (e.g., an S6t interface protocol location reporting answer message) may be transmitted by the MME 116 and to the HSS 112.

The attach/subscription/notification 208 may include, e.g., in a step 6, transmission, by the HSS 112, of an answer message. The answer message, such as a CIA message, (e.g., an S6t interface protocol location reporting answer message, with a code (201) associated with creation of the subscription) may be transmitted by the HSS 112 and to the NEF 204. In some instances, the answer message transmitted by the HSS 112 may include the HSS 112 forwarding the answer message (e.g., received from the MME 116), as the answer message being delivered to the NEF 204.

The attach/subscription/notification 208 may include, e.g., in a step 7, transmission, by the NEF 204, of a notification message. The notification message, such as a location reporting notify message, (e.g., a T8 interface protocol location reporting notify message, with a code (201) associated with creation of the subscription) may be transmitted by the NEF 204 and to the AF 206. In some instances, the notification message transmitted by the NEF 204 may include the NEF 204 forwarding the answer message (e.g., received from the HSS 112), as the answer message being delivered to the AF 206.

The attach/subscription/notification 208 may include one or more notification related steps associated with location reporting of the UE 102. For example, the notification related step(s), e.g., in a step 8, may include transmission, by the NEF 204, of an initial (or "previous") RIR message (e.g., an initial RIR message #1 associated with a TA and/or a base station). The initial RIR message (e.g., a Toa interface protocol location reporting RIR message) may be transmitted by the MME 116 and to the NEF 204. In some instances, the initial RIR message may include one or more attributes. The attributes may include a user identifier (e.g., an MSISDN) identifier) and/or a monitoring event report (e.g., a SCEF reference ID; and/or a monitoring type, such as "location reporting").

The attach/subscription/notification 208 may include, in the notification related step(s), e.g., and in a step 9, transmission, by the NEF 204, of a location reporting notification message (e.g., a location reporting notification message #1). The location reporting notification message (e.g., a T8/N33 interface protocol location reporting notification message) may be transmitted by the NEF 204 and to the AF 206.

The attach/subscription/notification 208 may include, in the notification related step(s), e.g., and in a step 10, transmission, by the NEF 204, of a location reporting result message (e.g., a location reporting result message #1). The location reporting result message (e.g., a T6a/N33 interface protocol location reporting result message, with the success service result code (2001)) may be transmitted by the NEF 204 and to the MME 116.

The attach/subscription/notification 208 may include the UE 102 changing the TA and/or the base station to the different TA and/or the different base station, respectively. Based on the UE 102 changing the TA and/or the base station, the notification related signal(s) (e.g., associated with location reporting) may include one or more signals (e.g., as part of the attach/subscription/notification 208) which may be exchanged between the UE 102 and the MME 116.

Delivery of the signal(s) associated with the UE 102 changing the TA and/or the base station may include delivery of one or more other TA changing/base station changing signals in the attach/subscription/notification 208. Delivery of the signal(s) associated with the UE 102 changing the TA and/or the base station may result in delivery of one or more other location reporting messages in the attach/subscription/notification 208. The other notification related message(s) (e.g., associated with location reporting) may include, for example, one or more other initial (or "previous") RIR signals, one or more other location reporting notification signals, one or more other RIA signals, etc., or any combination thereof.

In some examples, the other location reporting message(s) may include another initial (or "previous") RIR message (e.g., an RIR message #2 associated with the new TA and/or the new base station), another location reporting notification message (e.g., a location reporting notification message #2 associated with the new TA and/or the new base station), and another location reporting result message (e.g., a location reporting result message #2 associated with the new TA and/or the new base station). In those or other examples, delivery of the RIR message #2, the location reporting notification message #2, and the location reporting result message #2, for example, may occur in a similar way as for, respectively, the RIR message #1, the location reporting notification message #1, and the location reporting result message #1. In some instances, the RIR message #2 may include one or more attributes (e.g., associated with the new TA and/or the new base station) in a similar way as for the RIR message #1.

Figure 3:
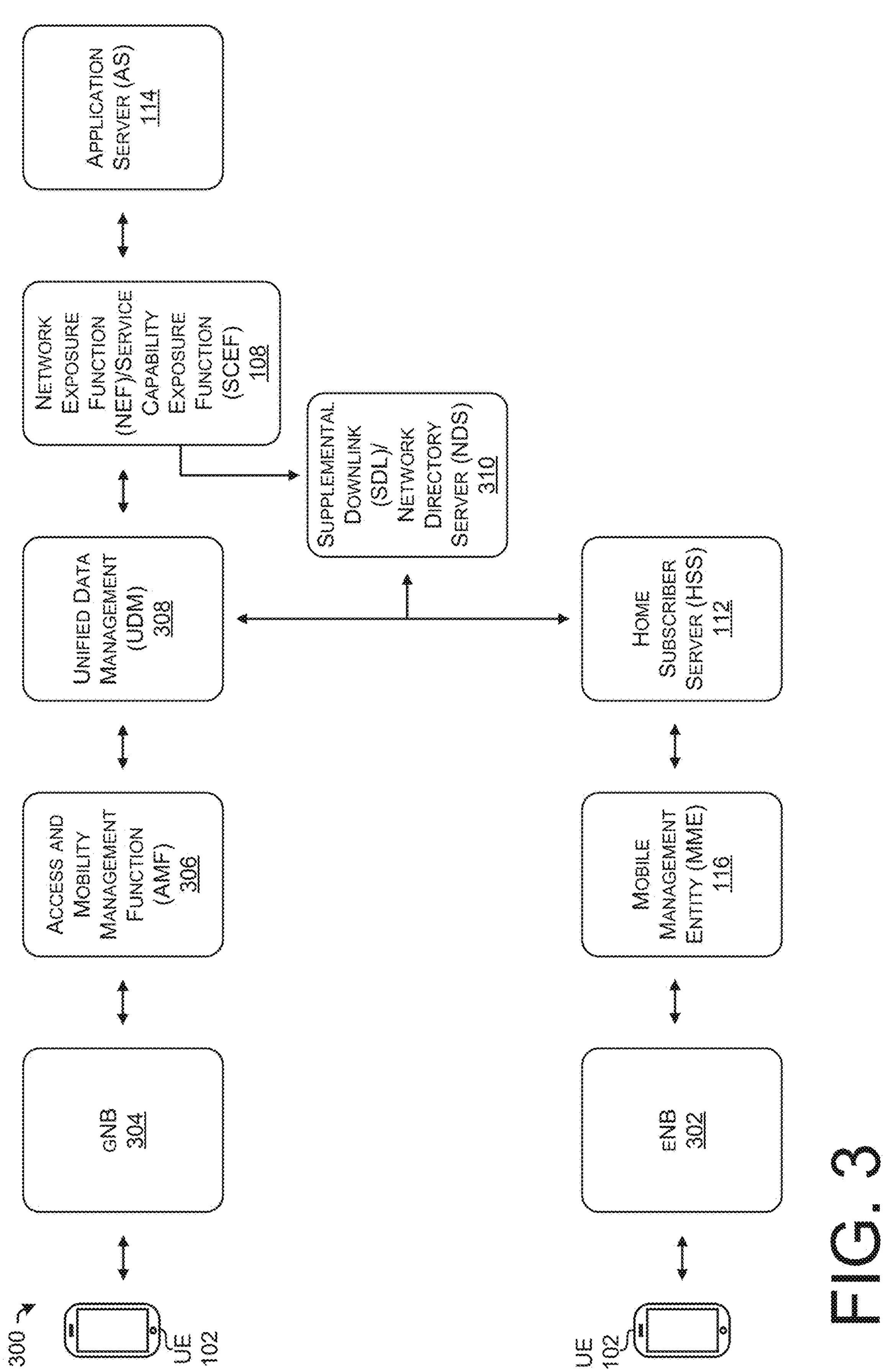
FIG. 3 is an illustrative environment depicting network functions with the NEF/SCEF utilized for performing the automatic subscription deletion management.

FIG. 3 is an illustrative environment 300 depicting network nodes with the NEF/SCEF utilized for performing the automatic subscription deletion management. The network nodes, to which any number of the UEs 102 can be connected via the cellular network, can include an eNB 302

(e.g., utilized to implement the base station 104), the HSS 112, the AS 114, and the MME 116, as discussed above with reference to FIG. 1.

The network nodes can include a gNB 304, an access and mobility management function (AMF) 306, a unified data management (UDM) 308, and a shared data layer (SDL)/network directory server (NDS) 310. The eNB 302, the HSS 112, the AS 114, the MME 116, the gNB 304, the AMF 306, the UDM 308, the SDL/NDS 310, and other components of the cellular network may perform functions described in 3GPP or other pertinent specifications.

The 5G base station may be utilized to connect any of the UEs 102 to a 5G network from among cellular networks represented by the cellular network. The AMF 306 may be utilized to receive requests (e.g., a service request, such as an attach request, a session management request, etc.) from a UE 102. The UDM 308 may include a unified data repository (UDR) subsystem. The UDM 308 may include a subsystem performing functions of an HSS 112, and/or may include and/or be communicatively connected with an HSS 112 and/or portion(s) of the HSS 112. The SDL/NDS 310 may be utilized to support the HSS 112 and may be utilized for data distribution and application hosting. The SDL/NDS 310 may be utilized for subscriber data management (SDM), such as for a unified platform for management of 4G and 5G subscriptions, and/or subscriber and service data through a single unified platform for 4G (LTE) and/or 5G cellular networks.

The NEF/SCEF 108 may provide the automatic subscription deletion management, as discussed above with reference to FIGS. 1 and 2, utilizing the network nodes. For example, the NEF/SCEF 108 may exchange signals with the HSS 112, the AS 114, and the MME 116, via various network nodes in some cases, such as the UDM 308 and/or the SDL/NDS 310.

FIG. 4 is a flow diagram of an illustrative process 400 for performing automatic subscription deletion management. At least part of the process 400 may be performed by the NEF/SCEF 108, as discussed above with reference to FIG. 1, and/or in connection with other components discussed herein.

At operation 402, the process can include receiving, by a network node (e.g., the NEF/SCEF 108) and from an AS (e.g., the AS 114), a trigger message (a deletion message 210) associated with deletion of a subscription. The trigger message may be received based on a different TA and/or a different base station being associated with the UE 102.

At operation 404, the process can include transmitting, by the network node (e.g., the NEF/SCEF 108) and to an HSS (e.g., the HSS 112), a configuration message (e.g., the CIR message 212) to delete the subscription. The configuration message can be transmitted to request deletion from the HSS 112 of the subscription. However, due to a network issue, the configuration message may be undelivered. The HSS 112 not receiving the configuration message may retain the subscription, notwithstanding the subscription being deleted from the NEF/SCEF 108.

At operation 406, the process can include receiving, by the network node (e.g., the NEF/SCEF 108) and from an MME (e.g., the MME 116), an event notification message (e.g., the RIR message 214). The event notification message can be received based on the MME 116 being triggered by the UE 102 (e.g., based on the UE 102 transmitting, to the MME 116, one or more signals indicating that the UE 102 has moved to a different TA and/or eNodeB). The MME 116 being triggered may dip into data of (e.g., obtain data from) the HSS 112. The MME 116 may send the event notification message to the NEF/SCEF 108 based on the MME 116 seeing that there is a subscription still standing in the HSS 112.

At operation 408, the process can include transmitting, by the network node and to the HSS 112, a deletion message (e.g., the CIR message 218) utilized by the HSS 112 to delete the subscription. The NEF/SCEF 108 can perform automatic subscription deletion by transmitting the deletion message (e.g., a second CIR message), causing the HSS 112 to delete the subscription. The HSS 112 deleting the subscription may be synchronized with the NEF/SCEF 108. The NEF/SCEF 108 may cause the MME 116 to synchronize with the NEF/SCEF 108, as well.

FIG. 5 illustrates is a block diagram of a server computer 500 architecture, in accordance with some examples of the present disclosure. The server computer 500 may be representative of an individual node (or network element) (e.g., a node of the network environment 100, as discussed above with reference to FIG. 1) or multiple nodes (or network elements) (e.g., multiple nodes of the network environment 100) of the cellular network.

As shown, the server computer 500 may include one or more processors 502 and one or more forms of computer-readable memory 504. The server computer 500 may also include additional storage devices. Such additional storage may include removable storage 506 and/or non-removable storage 508.

The server computer 500 may further include input devices 510 (e.g., a touch screen, keypad, keyboard, mouse, pointer, microphone, etc.) and output devices 512 (e.g., a display, printer, speaker, etc.) communicatively coupled to the processor(s) 502 and the computer-readable memory 504. The server computer 500 may further include communications interface(s) 514 that allow the server computer 500 to communicate with other computing devices 516 (e.g., other nodes, a UE(s), etc.) such as via a network. The communications interface(s) 514 may facilitate transmitting and receiving wired and/or wireless signals over any suitable communications/data technology, standard, or protocol, as described herein.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server computer 500. Any such computer-readable storage media may be part of the server computer 500.

The memory 504 can include logic 518 (i.e., computer-executable instructions that, when executed, by the processor(s) 502, perform the various acts and/or processes disclosed herein) to implement synchronization of subscriber data, according to various examples as discussed herein. For example, the logic 518 is configured to carry out signaling and/or communications associated with and the UE(s) 102, the network nodes (e.g., the NEF/SCEF 108, the HSS 112, the AS 114, the MME 116, as discussed herein). The memory 504 can further be used to store data 520, which may be used to implement synchronization of subscriber data, as discussed herein. In one example, the data 520 may include network information (e.g., the network information, as discussed above with reference to FIG. 1) and/or mobile device information (e.g., the mobile device information, as discussed above with reference to FIG. 1).

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A method comprising:

receiving, by a network exposure function (NEF)/service capability exposure function (SCEF) and from an application server (AS), a trigger message associated with deletion of a subscription;

transmitting, by the NEF/SCEF and to a home subscriber server (HSS), a configuration information request (CIR) message;

receiving, by the NEF/SCEF and from a mobile management entity (MME), an event notification message;

transmitting, by the NEF/SCEF, to the MME, and in response to receiving the event notification message, an error message based on the subscription not existing in the NEF/SCEF; and transmitting, by the NEF/SCEF and to the HSS, a deletion message utilized by the HSS to delete the subscription.

2. The method of claim 1, wherein transmitting the deletion message further comprises:

transmitting, by the NEF/SCEF and to the HSS, the deletion message based on the subscription not being previously deleted in the HSS.

3. The method of claim 1, wherein transmitting the deletion message further comprises:

transmitting, by the NEF/SCEF, to the HSS, based on the CIR message not being received by the HSS, and in response to receiving a reporting information request (RIR) message as the event notification message, the deletion message.

4. The method of claim 1, wherein receiving the trigger message further comprises:

forwarding, by the NEF/SCEF and to the HSS, a subscription message received from the AS, the subscription message being associated with the subscription not having any expiration; and receiving the trigger message associated with deletion of the subscription.

5. The method of claim 1, wherein receiving the trigger message further comprises:

forwarding, by the NEF/SCEF and to the HSS, a subscription message received from the AS, the subscription message being associated with the subscription having an expiration longer than a threshold expiration; and receiving the trigger message associated with deletion of the subscription.

6. The method of claim 1, wherein receiving the trigger message further comprises:

receiving, by the NEF/SCEF, from the AS, and based on a user equipment (UE) attaching to a network and moving to at least one of a tracking area or a base station, the trigger message.

7. The method of claim 1, wherein the CIR message comprises a first CIR message, and wherein transmitting the deletion message further comprises:

transmitting a second CIR message as the deletion message based on parameter values received from the MME and in the event notification message.

8. The method of claim 1, further comprising:

receiving, by the NEF/SCEF and from the HSS, a configuration information answer (CIA) message based on the HSS transmitting a confirmation message to the MME and receiving an answer message from the MME.

9. The method of claim 1, wherein receiving the trigger message further comprises:

receiving, by the NEF/SCEF, from the AS, and based on a user equipment (UE) attaching to a long term evolution (LTE) telecommunications network and moving to at least one of a tracking area or a base station, the trigger message.

10. A network element, comprising:

one or more processors; and memory storing computer-executable instructions that, when executed by the one or more processors, cause the one or more processors to perform operations comprising:

receiving, by a network node and from an application server (AS), a trigger message associated with deletion of a subscription;

transmitting, by the network node and to a home subscriber server (HSS), a configuration message to delete the subscription;

receiving, by the network node and from a mobile management entity (MME), an event notification message; and transmitting, by the network node and to the HSS, a deletion message utilized by the HSS to delete the subscription.

11. The network element of claim 10, wherein transmitting the deletion message further comprises:

transmitting, by the network node, to the MME, and in response to receiving the event notification message, the deletion message based on the subscription not existing in the network node.

12. The network element of claim 10, wherein the network node comprises a network exposure function (NEF) or a service capability exposure function (SCEF).

13. The network element of claim 10, wherein transmitting the deletion message further comprises:

transmitting, by the network node and to the HSS, the deletion message based on the subscription not being previously deleted in the HSS.

14. The network element of claim 10, wherein transmitting the deletion message further comprises:

transmitting, by the network node, to the HSS, based on the configuration message not being received by the HSS, and in response to receiving the event notification message, the deletion message.

15. The network element of claim 10, wherein receiving the trigger message further comprises:

forwarding, by the network node and to the HSS, a subscription message received from the AS, the subscription message being associated with the subscription i) not having any expiration, or ii) having an expiration longer than a threshold expiration; and receiving the trigger message associated with deletion of the subscription.

16. The network element of claim 10, wherein receiving the trigger message further comprises:

receiving, by the network node, from the AS, and based on a user equipment (UE) attaching to a network and moving to at least one of a tracking area or a base station, the trigger message.

17. A system comprising:

one or more processors; and memory storing computer-executable instructions that, when executed by the one or more processors, cause the one or more processors to perform operations comprising:

receiving, by a network node and from an application server (AS), a trigger message associated with deletion of a subscription;

transmitting, by the network node and to a home subscriber server (HSS), a configuration message;

receiving, by the network node and from a mobile management entity (MME), an event notification message; and transmitting, by the network node and to the HSS, a deletion message utilized by the HSS to delete the subscription.

18. The system of claim 17, wherein transmitting the deletion message further comprises:

transmitting, by the network node, to the MME, and in response to receiving the event notification message, the deletion message based on the subscription not existing in the network node.

19. The system of claim 17, wherein receiving the trigger message further comprises:

forwarding, by the network node and to the HSS, a subscription message received from the AS, the subscription message being associated with the subscription i) not having any expiration, or ii) having an expiration longer than a threshold expiration; and receiving the trigger message associated with deletion of the subscription.

20. The system of claim 17, the configuration message further comprising a first configuration message, the operations further comprising:

receiving, by the network node and from the HSS, a second configuration message based on the HSS transmitting a confirmation message to the MME and receiving an answer message from the MME.

* * * * *